E. A. LE FEVER.
METER CUT-OUT AND TESTING DEVICE.
APPLICATION FILED JAN. 2, 1914.
1,254,707.
Patented Jan. 29, 1918.
2 SHEETS—SHEET 2.
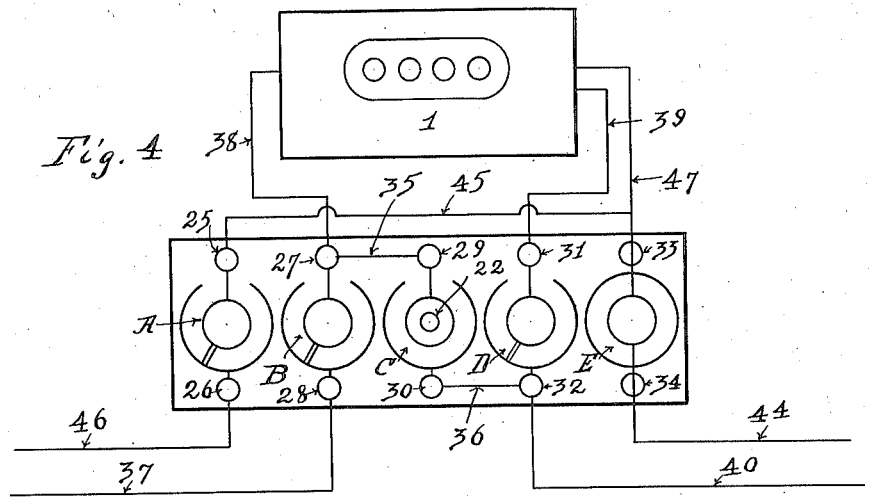
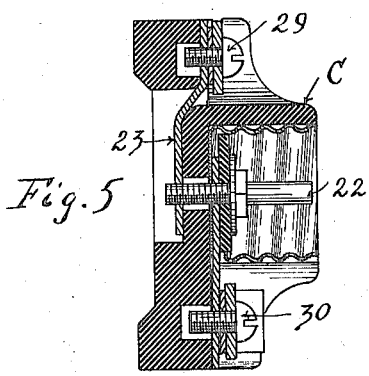
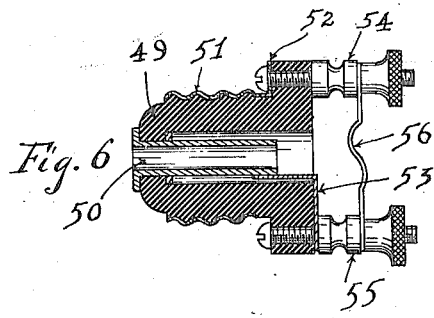
Witnesses:
A. W. Macomber
Geo. L. Moore
Inventor:
Earle A. Le Fever
by Hur Macomber
Atty

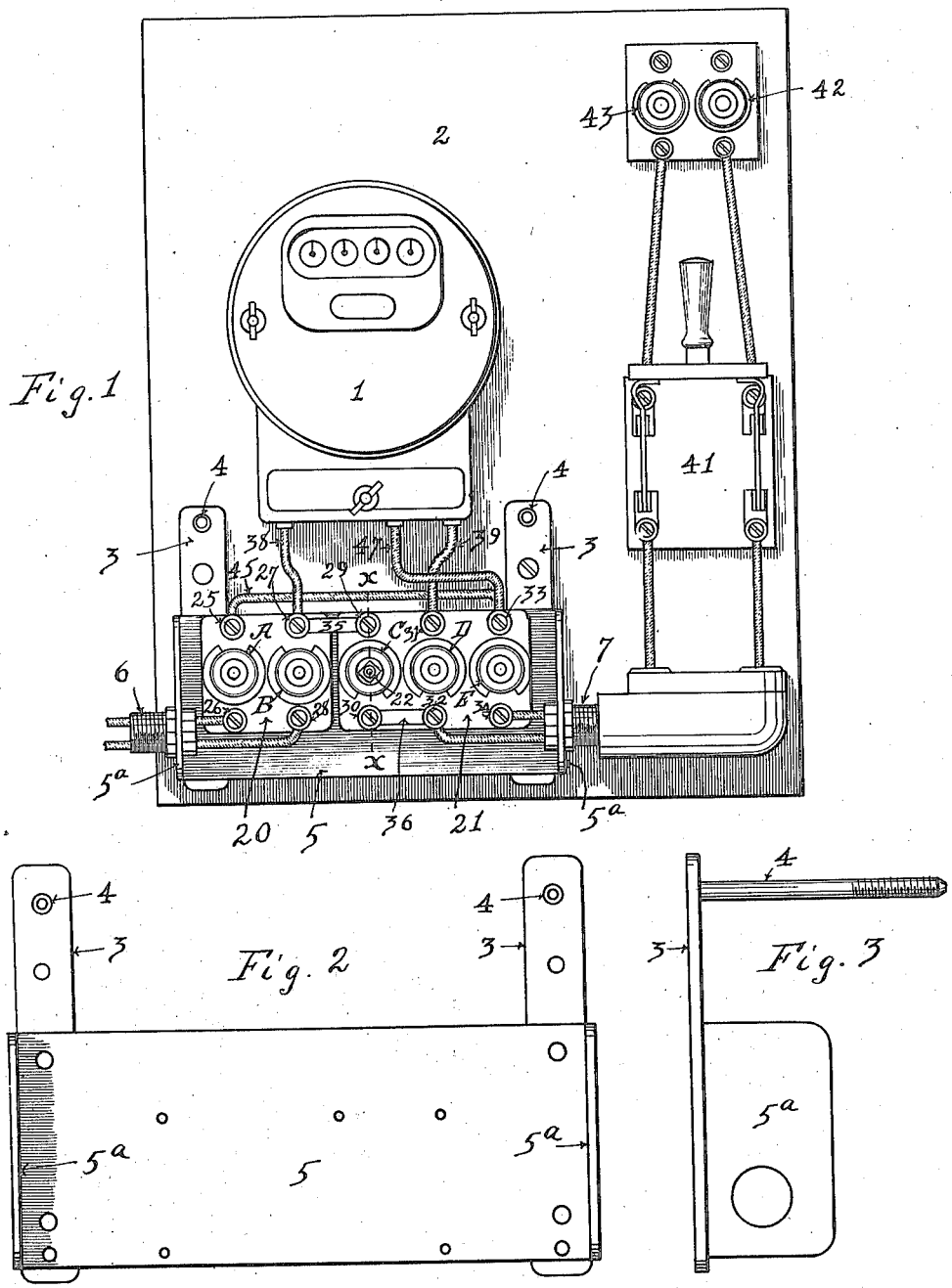

UNITED STATES PATENT OFFICE.

EARLE A. LE FEVER, OF BUFFALO, NEW YORK.

METER CUT-OUT AND TESTING DEVICE.

1,254,707.  Specification of Letters Patent.  Patented Jan. 29, 1918.

Original application filed July 25, 1913, Serial No. 781,100. Divided and this application filed January 2, 1914. Serial No. 809,863.

*To all whom it may concern:*

Be it known that I, EARLE A. LE FEVER, a citizen of the United States, residing at Buffalo, in the county of Erie and State of New York, have invented a new and useful Improvement in Meter Cut-Out and Testing Devices, of which the following is a specification.

My invention relates to meter cut-out and testing devices, and more particularly to such devices applied to meter and meter connections for measuring electric energy.

This application is, moreover, a division of my former application filed July 25, 1913, Serial No. 781,100.

The object of my invention is to provide cut-out and testing means whereby a person so authorized to do and provided with the proper means may test the meter at any time without interruption of service.

While I have herein shown certain features of my improved meter protection device, that invention is separately shown and claimed in my said application Serial No. 781,100.

Other features and objects of this invention will be more clearly understood from the following specification and appended claims, and from the drawings herewith forming a part of the specification, in which like characters of reference indicate corresponding parts, in which,—

Figure 1 is an elevation of a meter provided with my invention.

Fig. 2 is a face view of the plate upon which I mount my fuse-blocks.

Fig. 3 is an end view of the same.

Fig. 4 is a diagram of my wiring and cut-out system.

Fig. 5 is an enlarged section on the line *x—x* of Fig. 1.

Fig. 6 is a section of one of my specially constructed plugs, hereafter more fully described.

A meter, 1 of any desired type, is mounted in the usual manner upon a board or base 2. Secured to this base board are two base plates 3, 3, and to these base plates are secured upstanding screw-studs 4, 4, by means of which the cover is secured and sealed in the manner more fully described in my said application Serial No. 781,100. To said base plates 3, 3 is riveted a carrying plate 5, having upturned ends 5$^a$, upon the face of which plate are mounted the fuse-blocks 20 and 21, and through the upturned ends 5$^a$ are secured tubing nipples or conduits 6 and 7.

I bolt to the carrying plate 5 two standard fuse-blocks 20 and 21. The block 20 has two standard poles A and B, and the block 21 has three poles, C, D, and E, the pole D being standard and the poles C and E being modified as now described. The pole C has an outwardly-extending stud 22 which is electrically connected to the plate 23 which, in turn, is electrically connected to the binding-post 29, and the shell is electrically connected to the binding-post 30. In the pole E the insulation between the stud and shell is removed, so that the binding-posts 33 and 34 are in electrical connection when no plug is present—in fact, this pole acts simply as a binding-post, and is made in this form both for convenience of construction and for convenience in the use of my special plugs, hereafter described. The binding-posts 27 and 29 are electrically connected by a plate or wire 35, and the binding-posts 30 and 32 are similarly connected by a plate or wire 36. In the normal operating condition standard fuse-plugs are inserted in the poles A, B and D. In this normal condition current flows from line wire 37 to binding-post 28, fuse-plug of pole B, binding-post 27, wire 38, through current coil of meter, wire 39, binding-post 31, fuse-plug of pole D to binding-post 32, load wire 40 through switch 41 and fuse-plug 42 to load; thence back through fuse-plug 43 and switch 41 to wire 44, binding-post 34, pole E, binding-post 33, wire 45, binding-post 25, fuse-plug of A, binding-post 26 and line wire 46.

The circuit including the pressure coil of the meter is from wire 37, binding-post 28, fuse-plug of B, binding-post 27, wire 38, pressure coil of meter, wire 47, wire 45, binding-post 25, fuse-plug of A, binding-post 26 and wire 46. This circuit is constant—not being disestablished by connections for cut-out or test.

In order to test the meter without interrupting service, I employ three special fuse-plugs of the type shown in Fig. 6, which are my invention and which I will now describe. A dielectric body 49, substantially in standard form, has a tubular stud 50, which is capable of slipping over the stud 22 shown in Fig. 5. The screw-threaded ring 51 has an ear or extension 52, which is in electrical connection with the binding-post 54. The tube 50 is electrically connected by a plate or wire 53 with the binding-post 55. The binding-posts 54 and 55 are detachably connected electrically by a fuse or other wire 56.

One of these special plugs is inserted in pole C. It will be seen that this special plug in this case performs the same function as a standard plug in a standard pole. The purpose of employing this special plug and the special form of pole shown in Fig. 5 is to prevent error or carelessness in setting up the apparatus with a regular fuse-plug and pole, which would result in shunting the current around the meter, and to prevent a person unauthorized so to do from inserting a standard plug and thus cutting out the meter. With this special plug inserted, the meter is cut out, and current flows from wire 37 to binding-post 28, plug of pole B, binding-post 27, plate or wire 35, binding-post 29, special plug in pole C, binding-post 30, plate or wire 36, binding-post 32 and wire 40 to load, and back through wire 44 by the path previously described.

The standard fuse-plug at D is now removed and one of said special plugs inserted, the fuse-wire 56, however, having been disconnected from one of the binding-posts of the plug. Another of said special plugs is now inserted in the pole E. To the binding-post of D in electrical connection with the central stud of that pole and to either binding-post of the special plug in E are attached wires which will put the artificial testing load and instruments in circuit. Current for testing the meter will then flow from wire 37 to binding-post 28, pole B, binding-post 27, wire 38, current coil of meter, wire 39, binding-post 31, stud of pole D, binding-post of special plug in D in electrical connection therewith, artificial load and testing instruments to special plug in E, binding-post 33, wire 45, binding-post 25, plug in pole A, binding-post 26 and wire 46.

It will thus be seen that, by the use of standard apparatus simply arranged and the use of a minimum of special parts and connections, I am able to test a meter without any interruption of service and with the minimum of liability of error in setting up or restoring the regular connections; and by the use of the special pole above described, requiring the special plug also above described, the theft of current by cutting out the meter by means of a standard fuse-plug is made impossible.

Having thus described my invention, I claim:

1. In a cut-out and testing device of the type described, in combination with a base carrying the electrical connections, three standard cups capable of being electrically closed by standard fuse-plugs, elements interposed between the standard cups normally connected through the meter current coil and consisting of a non-standard cup constituting a gap when the second of said cups is electrically disconnected which is incapable of being closed by a standard fuse element, a special connecting element therefor and a binding-post consisting of a cup standard in form but having its two poles permanently closed and adapted to receive a standard plug capable of affording connection with the test load.

2. In a cut-out and testing device of the type described, in combination with a base carrying the electrical connections, three standard electrical connecting devices capable of being electrically connected by standard fuse devices, a gap-bridging device interposed between the standard cups normally connected through the meter current coil and consisting of a non-standard cup comprising elements secured to said base requiring special, non-standard connecting means, a special non-standard bridging element therefor and a binding-post consisting of a cup standard in form but having its two poles permanently closed and adapted to receive a standard plug capable of affording connection with the test load.

3. In a cut-out and testing device of the type described, in combination with a base carrying the electrical connections, three standard cups capable of being electrically closed by standard fuse-plugs, a standard cup interposed between the standard cups normally connected through the meter current coil and consisting of a non-standard cup provided with an upstanding post to prevent its being electrically closed by a standard fuse-plug, a fuse-plug therefor standard in character but apertured to fit over said post in order to make electrical connection and a binding-post consisting of a cup standard in form but having its two poles permanently closed and adapted to receive a standard plug capable of affording connection with the test load.

4. In a cut-out and testing device of the type described, in combination with a base carrying the electrical connections, three standard cups on said plate, the first cup being between the leading-out wire from the generator and the meter coil wire, the second between said meter coil wire and the wire leading to load, and the third in the wire leading back from load to the generator, a cup interposed between said first and second cups having its poles connected respectively one pole to each of said first and second cups, an upstanding post in said interposed cup to prevent the same from being closed electrically by a standard plug, a special plug therefor apertured to fit over said post, and a binding-post in the form of a standard cup but with its poles permanently connected electrically, and a standard plug therefor, whereby the current may be shunted past the meter without interruption of service and the meter tested.

In testimony that I claim the foregoing invention I have hereunto set my hand in the presence of two witnesses.

EARLE A. LE FEVER.

Witnesses:
 FRANK E. BOWES,
 NELSON B. PHILLIPS.